United States Patent [19]

Poorman et al.

[11] Patent Number: 4,836,637
[45] Date of Patent: Jun. 6, 1989

[54] EXPANDED-BEAM FIBER-OPTIC CONNECTOR

[76] Inventors: Thomas J. Poorman, 9797 Meadowglen, #2005, Houston, Tex. 77042; Josephine Lopez, 602 N. Broadway, McAllen, Tex. 78501; Christine L. Behrens, Rte. 1, Box 51E6, Rosenburg, Tex. 77471

[21] Appl. No.: 144,627

[22] Filed: Jan. 11, 1988

Related U.S. Application Data

[63] Continuation of Ser. No. 865,449, May 21, 1986, abandoned.

[51] Int. Cl.$^4$ ................................................ G02B 6/38
[52] U.S. Cl. ............................ 350/96.21; 350/96.18; 439/581
[58] Field of Search .................... 350/96.18–96.21; 29/458; 439/581

[56] References Cited

U.S. PATENT DOCUMENTS

| | | | |
|---|---|---|---|
| 3,644,874 | 2/1972 | Hutter | 339/89 |
| 3,829,195 | 8/1974 | Rawson | 350/96 |
| 4,053,200 | 10/1977 | Pugner | 339/177 R |
| 4,140,366 | 2/1979 | Makuch | 350/96.22 |
| 4,140,367 | 2/1979 | Makuch | 350/96.22 |
| 4,183,619 | 1/1980 | Makuch | 350/96.21 |
| 4,190,317 | 2/1980 | Makuch | 350/96.20 |
| 4,204,306 | 5/1980 | Makuch | 281/5 |
| 4,208,092 | 6/1980 | Mosanghan et al. | 350/96.21 |
| 4,396,032 | 4/1980 | Eggleston | 350/96.21 |
| 4,398,791 | 8/1983 | Dorsey | 350/96.18 |
| 4,422,710 | 12/1983 | Perona | 359/177 R |
| 4,422,716 | 12/1983 | Morimoto et al. | 350/96.21 |

OTHER PUBLICATIONS

Applications of Grin-rod lenses in optical fiber communications systems, Applied Physics vol. 19 No. 7 pp. 1127–1138.
Fiber coupling using graded index rod lenses. Applied Physics, vol. 19 No. 12 pp. 2011, 2018.
Nippon sheet glass co Ltd. Selfoc Micro Lens catalog.
Giannini Petro-Marine Catalog advertisement.

*Primary Examiner*—Joseph M. Gorski
*Attorney, Agent, or Firm*—Barry C. Kane

[57] ABSTRACT

The expanded-beam fiber, fiber-optic connector assembly includes a body having a longitudinal bore for receiving an aligning sleeve therein which has an axial hole for receiving a strand of optical fiber. The optical fiber may be surrounded by a stress member which is firmly anchored by a crimping sleeve to the exterior of the body. The optical fiber extending through the aligning sleeve is cleaved to within 0.020 inch of the end of the sleeve that slideably receives a ferrule containing a self focusing microlens in one end. The aligning sleeve mates with the ferrule such that the end of the optical fiber is axially aligned and in contact with the microlens. Two such connectors may be coupled together by an aligning ferrule such that the microlenses of each are no more than one quarter of an inch apart.

9 Claims, 1 Drawing Sheet

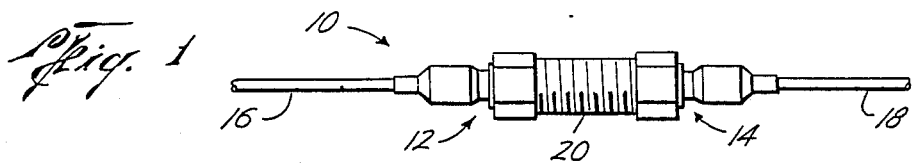
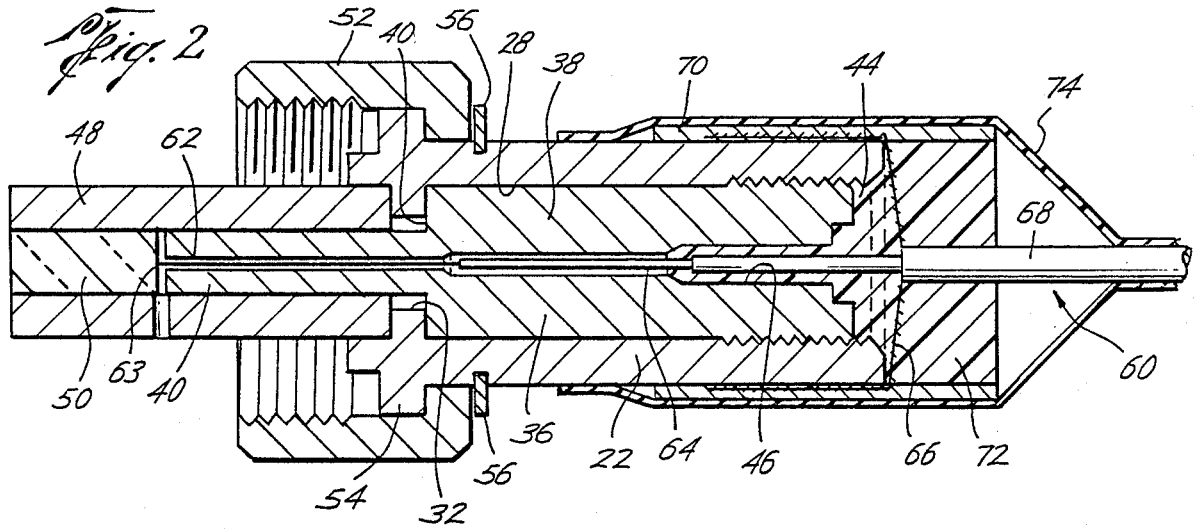
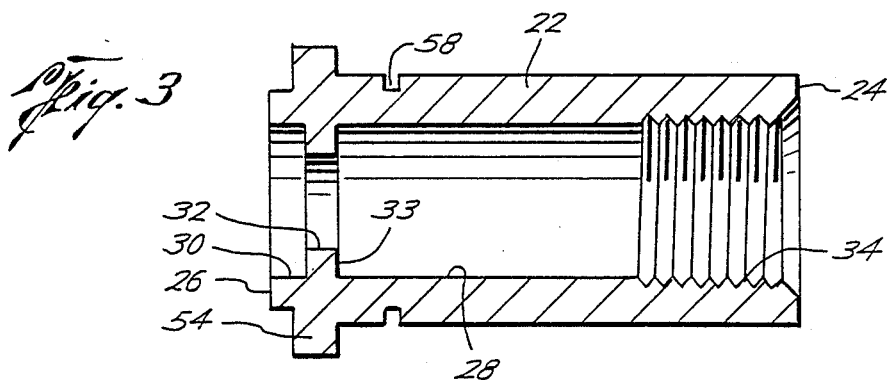
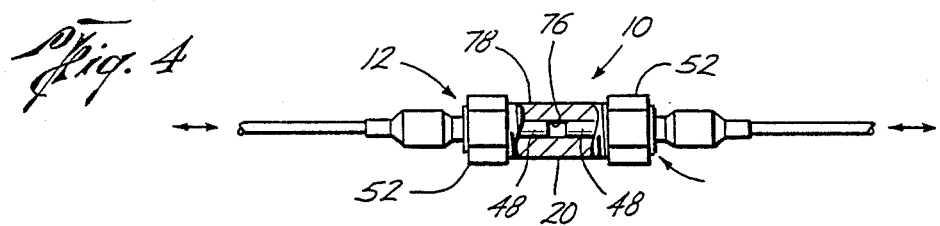
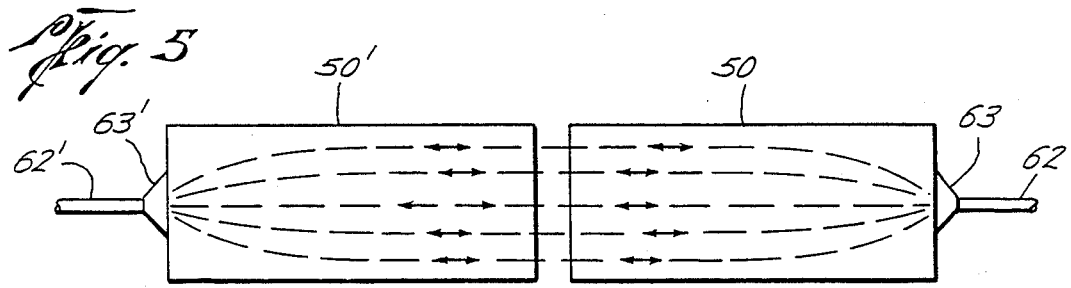

EXPANDED-BEAM FIBER-OPTIC CONNECTOR

This is a continuation of copending application Ser. No. 865,449, filed on May 5, 1986 now abandoned.

BACKGROUND OF THE INVENTION

1. Field of the Invention

This invention relates to optical couplers and connectors for use in interconnecting optical fibers in-line and for coupling optical fibers to circuit boards and the like.

2. Description of the Related Art

Electronic networks, such as those used in data telemetry and voice communication may be interconnected by optical fibers. In certain cases, optical signals may be transferred between other fibers by evanescent couplers. Such couplers transfer a specified portion of the optical energy propagating in one fiber to one or more other fibers.

In an ever-increasing number of applications, optical fibers are being used to transmit signals over substantially large distances. In contrast to traditional wire conductors, optical fibers require special hardware for mating the optical-fiber ends to other fibers, radiation sources such as LEDs, and pulse detectors. One such piece of hardware is an SMA-style connector such as those manufactured by Amphenol in Lisle, Illinois and Ensign-Bickford Optics Company in Avon, Connecticut.

One advantage in using optical fibers is the ability to transmit large amounts of information over strands having diameters substantially equal to human hair without experiencing electromagnetic interference. In contrast, a disadvantage is the requirement that fiber ends be precisely aligned in order to transfer the maximum signal strength. All too often, a portion or all of a signal loss may be due to poorly aligned connections.

Nippon Sheet Glass Company, Limited in Minato-ku, Tokyo, Japan developed a self-focusing microlens for use in coupling optical fibers to each other, optical sources or detectors. The microlens may collimate a diverging beam, converge a collimated beam, or converge a diverging beam, depending upon the length of the lens and the orientation. For the most part, all the microlenses are wave-length dependent.

The microlens is a cylindrical glass or plastic rod having a graded index of refraction which decreases as the square of the radial distance from the optical axis. Because of the parabolic index of refraction, the microlens performs the same optical functions as standard spherical lenses with the added feature of flat end surfaces and no spherical aberration. The cylindrical glass or plastic lens is concentrically mounted in one end of a metal sleeve. An optical fiber cemented within an aligning insert is inserted into the opposite end of the sleeve so that the end of the optical fiber is positioned near the focal point of the lens. The lens may accept light energy being emitted by the fiber end and may concentrate light energy at the focal point in the fiber tip, thus energy transfer between the lens and fiber is maximized.

The microlens described above is used primarily in the laboratory where sensitive and fragile centering guides align the microlenses in end-to-end arrangement. The networks in which they are arranged are so delicate that a gentle brush with the aligning table often results in an interruption of the system. Although the microlens requires a much less precision alignment than standard SMA-type connectors, they are not rugged enough for use in field applications.

SUMMARY OF THE INVENTION

It is an object of this invention to provide a rugged expanded-beam connector assembly for use under rigorous conditions without the need for sophisticated aligning guides.

It is another object of this invention to provide an expanded-beam connector assembly capable of relieving tensional strain upon the optical fiber.

It is yet another object of this invention to provide an expanded-beam connector assembly capable of mating with standard SMA-type connector fittings.

The expanded-beam, fiber-optic connector of this invention includes an elongate body having a first and a second end interconnected by a longitudinal bore having a restriction near the second end. A slip-nut concentrically surrounds the body and is held in place by an annular flange and a split-ring clip. An aligning sleeve having a converging axial hole extending from a trunk portion out through a neck portion, is received within the longitudinal bore such that the neck extends past the restriction and out the second end. A length of optical fiber encased within a cable having a predetermined portion of its sheath, stress member, and jacket removed, axially extends through the axial hole in the aligning sleeve and out the end of the neck. The optical fiber is cleaved such that no more than 0.020 inch of the fiber extends past the end of the neck. Cleaving after the fiber is passed through the aligning sleeve assures a clean and sharp fiber termination and eliminates the need to polish the fiber end. A ferrule having a microlens disposed in one end is slid over the neck and engages a portion of the longitudinal bore such that the end of the optical fiber is positioned at the focal point of the microlens. A drop of index matching gel at the fiber tip assures optical continuity. The optic fiber is cemented within the aligning sleeve and insured by draping the stress member around the body and surrounded by a sleeve which is crimped in place. Two such connectors may be placed in end-to-end alignment by way of a coupling ferrule having a threaded outer portion and an inner diameter having substantially the same diameter as the lens ferrule. The length of the coupling ferrule is such that the ends of the couplers attached thereto have approximately one eighth of an inch therebetween. It is preferred that outside dimensions of the expanded beam couplers be substantially equal to standard SMA-type fiber optic couplers.

BRIEF DESCRIPTION OF THE DRAWINGS

A better understanding of the benefits and advantages of my invention may be obtained from the appended detailed description and the drawings, wherein:

FIG. 1 is a general diagram of a fiber-optic, in-line connector;

FIG. 2 is an elevational side view in cross section of an expanded beam connector embodied in this invention;

FIG. 3 is an elevational side view in cross section of the connector body;

FIG. 4 is a cross sectional view of the connector assembly of FIG. 1; and

FIG. 5 schematically represents two graded-index microlenses in end-to-end alignment.

DETAILED DESCRIPTION OF THE PREFERRED EMBODIMENT

FIG. 1 generally shows an optical in-line connector assembly 10 including two expanded-beam connectors 12 and 14, each coupled to one end of a fiber optic cable 16 and 18 respectively. The expanded-beam connectors 12 and 14 are interconnected by a coupling ferrule 20. The coupling ferrule 20 may be used for in-line connections or disposed in a panel for connections to light-emitting diodes (LEDs) or detectors.

FIG. 2 is a side elevational side view in partial cross section of the expanded-beam connector 14 which includes an elongate housing or body 22, which is preferably but not necessarily cylindrical in form, having a first and second ends 24 and 26, respectively.

Refer to FIG. 3 showing a side elevational view in cross section of the elongate body 22. The first end 24 defines a longitudinal bore 28 extending substantially through body 22 towards the second end 26. The second end 26 defines a cylindrical recess 30 having a diameter substantially equal to and concentric with longitudinal bore 28. An axial bore 32 of lesser diameter interconnects the longitudinal bore 28 and the cylindrical recess 30. A shoulder 33 is defined between longitudinal bore 28 and bore 32. A predetermined portion of the longitudinal bore 28 nearest the first end 24 may be threaded and is generally indicated as 34.

Returning to FIG. 2, an aligning sleeve 36 having a trunk portion 38 with a diameter substantially equal to longitudinal bore 28, and a neck portion 40 concentrically extending from one end, having a diameter substantially equal to that of the axial bore 32, is received within longitudinal bore 28 such that the neck portion 40 passes through axial bore 32 and extends out from the second end 26 of body 22 by a predetermined distance. A shoulder 42 is defined at the junction of the neck 40 with the trunk 38 and is urged against shoulder 33 of longitudinal bore 28. The end of trunk 38 nearest the first end 24 may be threaded to engage threads 34.

Defined in the threaded end of aligning sleeve 36 may be a slot 44 of appropriate size to receive the head of a screw driver to be used to thread aligning sleeve 36 within longitudinal bore 28. Defined in the bottom of slot 44, coaxial with trunk portion 38, is a converging hole 46 extending the length of the aligning sleeve 36. The diameter of hole 46 is substantially larger at the end having slot 44 then at the end of the neck portion 40. It is preferred that the diameter of hole 46 be substantially equal to 0.50 millimeter at the end of the neck 40. The change in the diameter of hole 46 is gradual from one end to the other end and the transitions are tapered. Although the tapered change in diameter is not necessary, it is preferred.

A lens ferrule 48, having an outside diameter substantially equal the cylindrical recess 30 and an inside diameter substantially equal to the diameter of the neck portion 40 of aligning sleeve 36, has one end engaging said cylindrical recess 30 and slideably receives the neck portion 40. A graded-index microlens 50, such as a 0.25 SML microlens manufactured by the Nippon Sheet Glass Company, Limited of Minato-ku, Tokyo, Japan, may be disposed in the other end of the lens ferrule 48. It is preferred that the microlens 50 be set back from the end of the lens ferrule 48 so as to reduce scratching of the microlens surface. The lens ferrule 48 and microlens 50 may be an M-OPAL-W18 assembled lens also manufactured by Nippon Sheet Glass Company, Limited.

The M-OPAL-W18 assembled lens package consists of a lens ferrule complete with a microlens, and an aligning sleeve similar to the neck portion 40 of this invention; however, the aligning sleeve from Nippon Sheet Glass Company cannot be used as purchased because of dimension differences in the lengths of the necks.

Slideably received about the exterior of the connector body 22 is a slip nut 52 which is slid against an annular flange 54 proximate the second end 26. The slip nut 52 is prevented from sliding back-off the body 22 by a split-ring clip received within an annular channel 58 in the exterior of the body 22.

A fiber optic cable 60 having at least one enclosed optic fiber 62 wrapped by a protective sheath 64, a stress member 66 such as a Kevlar braid, and surrounded by a cable jacket 68, enters the connector 14 from the first end 24. Predetermined portions of the cable 60 are stripped away so as to expose the optic fiber 62, sheath 64 and stress member 66. The optic fiber 62 and sheath 64 are disposed within hole 46 such that the end of optic fiber 62 protrudes from the end of neck 40. The stress member 66 surrounds the exterior of end 24 of body 22 and is held tightly thereon by a crimping sleeve 20 that is slideably received over the cable 60 and onto the connector body 22. The crimping sleeve 70 is crimped around the body 22 so as to securely hold the stress member 66. An epoxy resin 72 may be allowed to soak into the first end 24 of the connector, partially infilling hole 46 and surrounding the optic fiber sheath 64, the stress member 66 and the cable jacket 68 at the first end 24. A heat-shrinkable jacket 74 is received over the connector body 24 behind the slip nut 52 and partially over a length of the fiber optic cable 60 and molded therearound.

As briefly mentioned above, it is preferred that the transitions in the diameter of hole 46 in aligning sleeve 36 be a gradual one. This is so the optic-fiber end may be easily inserted through the aligning sleeve 36 and to prevent damaging the end of the exposed optic-fiber.

Refer to FIG. 4 where the connector assembly 10 is shown in partial cross section. As generally illustrated above, the expanded-beam connectors 12 and 14 previously described are each coupled to an end of a coupling ferrule 20. The coupling ferrule 20 may be a tube 76 of predetermined length having a threaded outer portion 78. The interior of the tube 76 has an inner diameter substantially equal to the outer diameter of the lens ferrule 48 and the distance from end-to-end is such that when the two expanded-beam connectors are coupled thereto by the slipnuts 52, the distance between the ends of the microlens may be upwards of 0.25 inch but it is preferred that they be separated by 0.050 to 0.125 inch for maximum signal transfer. That is to say that the variance in signal loss within the preferred separation distance may be approximately 0.1 decibel.

FIG. 5 is a schematic representation of two graded-index microlenses generally indicated as 50 and 50' and optic fibers 62 and 62', respectively. It is preferred that the ends of each optic fiber 62 and 62' be essentially touching each lens and axially aligned therewith. In a preferred embodiment of this invention, an index matching gel 63 covering the tip of each fiber and in contact with the lens assures optical continuity therebetween. Index matching liquids have been used in the past between the optical fiber tip and the lens, however, the index matching liquids are easily contaminated outside the laboratory and tend to evaporate, leading to a reduction in light transmission. The gel 63 reduces evaporation and contamination.

As shown in FIG. 5, a diverging beam emitted from the end of fiber 62 is collimated by lens 50 and passed to lens 50' which converges the beam and is focused at the tip of fiber 62'. The reverse would happen if the beam were emitted by fiber 62'. It should be remembered that these dimensions are dependent upon the wave length of light being transmitted. It is preferred that a 0.83 micrometer wave length be used.

In manufacturing each expanded-beam connector such as 12 or 14, it is preferred that the aligning sleeve 36 be inserted and secured within the connector body 22. Approximately 1.5 inches of the cable jacket 68 may be stripped from the end of the fiber-optic cable 60, exposing the stress member 66 and the protective sheath 64. It is preferred that the stress member 66 and protective sheath 64 be trimmed to a length substantially equal to 0.5 inch each. The heat-shrinkable jacket 74 and crimping sleeve 70 should be slid over the fiber-optic cable followed by inserting the exposed optic-fiber 62 and the surrounding protective sheath 64 into the hole 46 of the aligning sleeve 36 until approximately the entire exposed optic-fiber 62 protrudes from the end of neck 40. A substantially quick setting epoxy resin 72 may be applied to the protective sheath just prior to inserting the optic-fiber 62 through the aligning sleeve 36. The exposed optic-fiber 62 protruding from the end of neck 40 is cleaved by a fiber-optic cleaver within substantially 0.20 inch from the end of the neck 40. The cleaved end of the optic fiber 62 is examined under a microscope to check the quality of the cleaved end. The cleaved end may be acceptable provided the fiber end is substantially perpendicular to the length and is essentially smooth. Cleaving the end of fiber 62 after inserting the fiber through the aligning sleeve is important to this method of manufacture, thus preventing damage to the end of the fiber which might result from abrasion along the wall of axial hole 46. Thus, the end of the optic fiber does not need to be polished, provided an acceptable cleave is made. Upon an acceptable cleave, the optic fiber end is withdrawn inwards towards the end of neck 40 until substantially 0.005 inch of the fiber end protrudes from the end of neck 40. A drop of index matching gel 63 is applied to the end of fiber 62. The lens ferrule 48 complete with the graded-index microlens 50 is slid over the end of neck 40 and urged within the cylindrical recess 30 in the second end of body 22 and epoxied in place. The length of the neck 40 is such that the end of the optic fiber 62 is positioned substantially at the focal point of the microlens 50. The index matching gel 63 surrounds the contact of the optical fiber tip with the microlens, preventing the light from backscattering and leaking therefrom. It is preferred that an optically clear, epoxy resin such as that used in manufacturing conventional glass lens, be used if an index matching gel is not available.

The finishing touches in assembling the expanded-beam connector involve securing the stress member 66 to the exterior of the body 22 by way of the crimping sleeve 70. An epoxy resin 72 is applied to the inside of the crimping sleeve and allowed to soak the stress member 66 before molding the heat-shrinkable jacket 74 along the body 22, crimping sleeve 70, and a portion of the fiber optic cable 60.

Operation of the expanded-beam connector is easily accomplished by simply connecting the connector 12 or 14 to the coupling ferrule 20 by way of engaging the slip nut 52 with the threads surrounding the coupling ferrule. An optical signal traveling in either direction through optic fiber cable 16 or 18 is transmitted to the other by the expanded-beam connector coupled to the coupling ferrule 20.

For illustrative purposes, my invention has been described with a certain degree of specificity. Variations will occur to those skilled in the art but which may be included within the scope and spirit of this invention which is limited only by the appended claims.

I claim as my invention:

1. A fiber-optic connector assembly, comprising in combination:
   a body having a bore axially extending therethrough, defining a first and a second end, said bore having a restriction at said second end;
   an aligning sleeve having a converging axial hole, received and threadably anchored in said bore, said aligning sleeve having a neck portion extending through said restriction and out from said second end;
   a lens ferrule in intimate contact with said second end of said body, said neck portion of said aligning sleeve extending into said ferrule;
   a self-focusing microlens concentrically disposed within said lens ferrule and adjacent an end of said neck portion;
   an optical fiber having a stress member, received in said first end of said body, and axially disposed within said aligning sleeve, so that an end of said optical fiber is with said self-focusing microlens axially aligned at a focal point thereof;
   means for coupling said stress member to said first end of said body, fixing said optical fiber within said aligning sleeve; and
   means for coupling said fiber-optic connector assembly in axial alignment to a like connector assembly.

2. A connector assembly as recited in claim 1, wherein said means for coupling said fiber-optic connector assembly comprises:
   a coupling ferrule for receiving said lens ferrule coupled to said body; and
   means for rigidly securing said ferrule and said body to said coupling ferrule.

3. A connector assembly as recited in claim 2, further comprising means disposed between said optical fiber and said self-focusing microlens for providing optical continuity therebetween.

4. An expanded beam, fiber-optic connector assembly, comprising:
   a body having a first and a second end and a longitudinal bore extending therethrough;
   an aligning sleeve threadably disposed within said longitudinal bore of said body, having an axial hole therein and a neck portion of said aligning sleeve extending from said first end of said body;
   means for coupling a self-focusing microlens to said neck portion of said aligning sleeve extending from said first end of said body;
   an optical fiber having an end extending through said aligning sleeve, said end of said fiber axially aligned with said self-focusing microlens at a focal point thereof; and
   means for aligning said self-focusing microlens with a like microlens in another connector.

5. A connector assembly as recited in claim 4, further comprising a index matching means between said end of said optical fiber and said self focusing microlens.

6. A fiber optic connector assembly as recited in claim 4 wherein said means for coupling, comprises a lens ferrule having an inside diameter substantially equal to the outside diameter of said neck portion.

7. A fiber optic connector assembly as recited in claim 6 wherein said means for aligning comprises a coupling ferrule having an inside diameter substantially equal to an outside diameter of said lens ferrule and a length such that the lenses of fiber-optic connectors coupled to each end are no more than one-quarter of an inch apart.

8. An expanded-beam fiber-optic connector assembly, comprising:
   a connector body of predetermined dimensions having a first and a second end, said first end defining a longitudinal bore extending substantially therethrough, said second end defining a recess concentric with said longitudinal bore, interconnected with said longitudinal bore by an axial bore;
   an aligning sleeve having a trunk and a lesser diameter neck concentrically extending therefrom disposed within said longitudinal bore so that said neck extends through said axial bore and out said recess, said aligning sleeve further having a converging hole axially extending therethrough with a diameter converging from the trunk end to the neck end;
   a length of optical fiber enclosed within a fiber-optic cable having predetermined lengths of a protective sheath, braided stress member, and cable jacket stripped therefrom, disposed within said converging hole so that said optical fiber protrudes from the end of said neck, the end of said optical fiber cleaved substantially perpendicular to the length thereof to achieve an essentially flat surface at the end of said fiber approximately 0.005 inch from the end of said neck;
   an index matching gel covering the end of said optical fiber extending from the end of said neck;
   a ferrule having a self-focusing microlens disposed in one end, slidably received over said neck so that said ferrule is engaged with said recess, placing said optical fiber end in intimate contact with said microlens; and
   means for coupling said body and attached aligning sleeve and microlens to a coupling ferrule.

9. The connector assembly as recited in claim 8, further comprising:
   said stress member draped about the first end of said body; and
   a crimping sleeve concentrically received over said first end of said body and said stress member and crimped in place for firmly anchoring said fiber-optic cable within said body.

* * * * *